W. S. PIERCE, Jr.
LOCK FOR NUTS AND THE LIKE.
APPLICATION FILED DEC. 12, 1918.

1,343,334.

Patented June 15, 1920.

Inventor,
Winslow S. Pierce, Jr.
By Sheffield & Betts,
His Attorneys.

UNITED STATES PATENT OFFICE.

WINSLOW S. PIERCE, JR., OF BAYVILLE, NEW YORK.

LOCK FOR NUTS AND THE LIKE.

1,343,334.     Specification of Letters Patent.     Patented June 15, 1920.

Application filed December 12, 1918. Serial No. 266,386.

*To all whom it may concern:*

Be it known that I, WINSLOW S. PIERCE, Jr., a citizen of the United States, and a resident of Bayville, Long Island, county of Nassau, and State of New York, have invented a certain new and useful Improvement in Locks for Nuts and the like, of which the following is a description.

My invention relates to a means for preventing the accidental detachment of nuts, washers and sleeves from bolts and the like, and has as its principal object the provision of means for accomplishing the result mentioned, which shall be convenient and efficient in operation and at the same time be simple and inexpensive to manufacture.

The second object of my invention is to provide an improved locking pin.

Another object of my invention is to provide a bolt so designed that a locking pin may be readily inserted therein.

A further object of my invention resides in a particular arrangement and combination of parts hereinafter described.

In the drawing which accompanies and forms a part of this disclosure:

In the separate views, the same part is designated by the same reference character.

Figure 1:
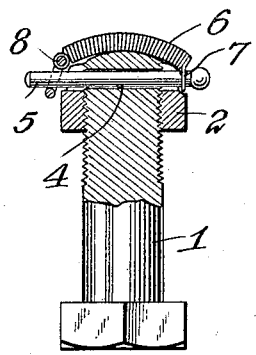
Figure 1 is an elevational view of a bolt partly in section, illustrating a preferred embodiment of my invention.

Referring in detail to the drawing, 1 is a bolt threaded at one end in the usual manner and on which is threaded a nut 2 of a well known form. As will be seen in Figs. 1 and 2, nut 2 is cut away at various points around its outer edge to form opposed openings or recesses, such as 3, and the outer end of the bolt has a hole 4 drilled therein. It will be seen that when the nut 2 has been screwed into the bolt 1 a sufficient distance, a locking cotter pin, such as 5, may be passed through the hole 4 and two of the opposed or alined recesses 3 which may be brought into proper relative position with respect to the hole 4, the nut 2 thus being prevented from turning in either direction. According to previous practice, the hole 4 has been made materially larger than the ordinary cotter pin used therewith, so that the pin may be readily passed in and out of the hole. This has been practically necessary for the reason that the cotter pin is usually a split pin. According to my invention, however, I make the pin solid, and make it just sufficiently smaller than the hole so that it may conveniently be inserted therein, a "push" fit being permissible. In this arrangement, there is, consequently, a minimum tendency for the pin to work loose. As a further means for preventing the pin from dropping out in the course of ordinary usage, I provide a spring such as 6, one end of which is secured in a small hole 7 in the pin 5, the other end of the spring being fastened to a ring such as 8. The ring 8 has a hole therein which is materially larger than the pin 5, so that the ring may be readily passed on and off of the pin. As shown in the drawing, after the pin has been passed through the hole 4, the spring is brought over the end of the bolt or around the curved surface thereof and extended so as to pass the ring onto the end of the pin 5. The spring 6 is of such length that normally, as in the position shown in the drawing, or if passed around the curved surface of the bolt, there is no significant tension on the spring, but it is of such strength that a material force must be applied to release the ring 8 from the end of the pin either by pulling on the head of the pin or by pulling on the ring.

It has been found that considerable difficulty is often experienced in inserting a cotter pin in the hole therefor and this difficulty would naturally be increased in using a solid instead of a split pin. Consequently I have marked the end of the bolt as indicated at 9 to show the line of the hole 4, and I believe this arrangement to be a novel and valuable feature of my invention.

Figure 2:
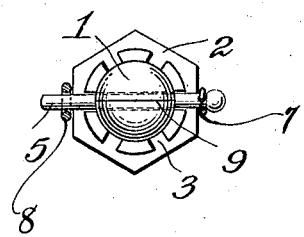
Fig. 2 is an end view of the parts shown in Fig. 1, part being sectioned and removed for purposes of illustration.
Figure 3:
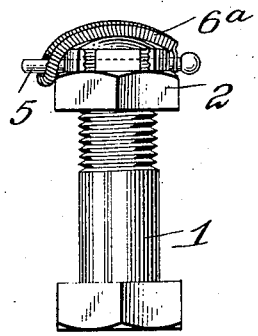
Fig. 3 is an elevational view of a bolt and nut having my invention applied thereto, but illustrating a different form of locking spring.

Referring more particularly to Fig. 3, the arrangement shown in this figure is identical with that of Figs. 1 and 2, with the exception that in Fig. 3 I have shown a spring 6a made in the form of a loop and of such length that it must be extended or stretched to pass over the end of the pin when the same has been passed through the hole 4 in the bolt.

It will be understood that while I have shown and described the preferred embodiment of my invention, that I do not wish to be limited to the exact details of the structure herein disclosed. Moreover, it will be understood that parts of my invention may be used without using the whole.

Having thus described my invention, I claim:

1. The combination with a cotter pin having a portion constructed to pass through and project from the structure with which the pin may be used, and resilient means whereby said pin may be secured in locking position, said means when active engaging the outside surface of said projecting portion of the pin, said means and pin being so constructed and arranged that they are released from mutual engagement at said projecting portion by stress applied longitudinally of said pin without damage to either.

2. The combination with an apertured part of a retaining pin normally occupying an aperture in said part and having both ends extending without said aperture, and resilient means for securing said pin in said aperture, said means being attached near one end of said pin and held in a state of tension when active by non-locking engagement with the surface of the other end of said pin.

3. The combination with a cotter pin having a portion constructed to pass through and project from the structure with which the pin may be used, and resilient means whereby said pin may be secured in locking position, said means when active engaging the outside surface of said projecting portion of the pin.

4. The combination with a retaining pin, of spring means for securing said pin under normal working conditions in engagement with the parts to be held in combination, said means being secured near one end of said pin, and being constructed and arranged to be capable of extending about the periphery of a part through which the pin may extend and to have sliding engagement with the outer surface of the free end of the pin, whereby said pin may be released by pressure exerted longitudinally on said pin in opposition to said securing means.

5. The combination with a retaining pin having a substantially straight portion adapted, when the pin is in use, to extend through and project beyond the parts to be locked, means for securing said pin in locking position, said means when active engaging said projecting portion of the pin, said pin and means being so constructed and arranged that they are released from mutual engagement at said projecting portion by stress applied longitudinally of said pin without damage to either.

6. The combination with a bolt having a hole therethrough near one end, and a nut therefor having a plurality of opposed openings therein of a pin for said hole and openings having a spring secured to one end thereof, one end of said spring having a ring thereon designed to readily pass over the end of said pin when the pin has been inserted in said hole in the bolt, said spring being of such length that it is substantially relaxed after it has been passed over the end of said bolt and said ring passed onto said pin.

7. The combination with a pin of a spring secured thereto near one end, and a ring secured to the free end of said spring, said ring being designed to pass over one end of said pin.

8. The combination with a retaining pin having a substantially straight portion adapted, when the pin is in use, to extend through and project beyond the parts to be locked, resilient means for securing said pin in locking position, said means and pin being so constructed and arranged that they are released from mutual engagement at said projecting portion by stress applied longitudinally of said pin without damage to either.

9. The combination with apertured parts, of a retaining pin for said parts normally occupying registering apertures therein and having both ends extending without said apertures, and means for securing said pin in locking position, said means and pin being so constructed and arranged that they are released from mutual engagement at said projecting portion by stress applied longitudinally of said pin without damage to either.

10. The combination with apertured parts, of a retaining pin for said parts normally occupying registering apertures therein, and having both ends extending without said apertures, and a spring secured near one end of said pin and held in a state of tension when active by non-locking engagement of its other end with the surface of said pin when the pin is in.

11. The combination with an apertured structure of a cotter pin normally occupying an aperture in said structure and projecting beyond the entirety of said structure at both ends when in use, and means whereby said pin may be secured in locking position, said means when active engaging the outside surface of one of said projecting portions of the pin and being releasable therefrom by stress applied longitudinally of said pin without damage to either.

12. The combination with a cotter pin having a portion constructed to pass through an aperture in the structure with which the pin may be used and having means for preventing the pin from slipping entirely through said aperture in the direction in which said portion is passed thereinto, of releasable resilient means whereby said pin may be secured in locking position, said resilient means when active engaging the outside surface of said portion of the pin and being released therefrom by deformation of said resilient means within its elastic limit.

WINSLOW S. PIERCE, Jr.